United States Patent
Brink et al.

(10) Patent No.: US 9,948,127 B2
(45) Date of Patent: Apr. 17, 2018

(54) VOLTAGE SUPPLY COMPENSATION

(71) Applicant: NXP B.V., Eindhoven (NL)

(72) Inventors: Klaas Brink, Eindhoven (NL); Rene Geraets, Eindhoven (NL); Oswald Moonen, Eindhoven (NL)

(73) Assignee: NXP B.V., Eindhoven (NL)

( * ) Notice: Subject to any disclaimer, the term of this patent is extended or adjusted under 35 U.S.C. 154(b) by 149 days.

(21) Appl. No.: 14/798,040

(22) Filed: Jul. 13, 2015

(65) Prior Publication Data

US 2017/0018946 A1    Jan. 19, 2017

(51) Int. Cl.
| | |
|---|---|
| *H04B 5/00* | (2006.01) |
| *H04B 17/00* | (2015.01) |
| *H02J 5/00* | (2016.01) |
| *H02J 17/00* | (2006.01) |
| *H02J 7/02* | (2016.01) |
| *H02J 7/04* | (2006.01) |
| *H02J 50/12* | (2016.01) |
| *H02J 50/80* | (2016.01) |

(52) U.S. Cl.
CPC .............. *H02J 7/025* (2013.01); *H02J 7/04* (2013.01); *H02J 5/005* (2013.01); *H02J 50/12* (2016.02); *H02J 50/80* (2016.02); *H04B 5/0031* (2013.01); *H04B 5/0037* (2013.01); *H04B 5/0081* (2013.01)

(58) Field of Classification Search
CPC ............. H02J 7/025; H02J 50/80; H02J 17/00
USPC .......................................... 320/108; 307/104
See application file for complete search history.

(56) References Cited

U.S. PATENT DOCUMENTS

| | | | | |
|---|---|---|---|---|
| 4,947,407 A | * | 8/1990 | Silvian | A61N 1/3727 329/347 |
| 5,418,353 A | * | 5/1995 | Katayama | G06K 19/0723 235/375 |
| 8,412,963 B2 | * | 4/2013 | Tsai | G06F 1/266 307/104 |
| 2005/0149784 A1 | * | 7/2005 | Ishida | G01R 31/31709 714/724 |
| 2008/0024208 A1 | * | 1/2008 | Oishi | H04L 27/06 329/308 |

(Continued)

OTHER PUBLICATIONS

19 V Qi low power A1/A10 transmitter solution, NXP Data Sheet TL431 (Accessed Jun. 25, 2015) (http://www.nxp.com/applications/power-management/Wireless-charging-solutions/19-V-wireless-charger.html).

(Continued)

*Primary Examiner* — Samuel Berhanu
*Assistant Examiner* — Tarikh Rankine

(57) ABSTRACT

A power supply circuit can be configured to generate a supply voltage that provides power to the apparatus. A signal generation circuit can be configured to generate a radio frequency (RF) charging signal. An amplification circuit can be configured to amplify the RF charging signal using the supply voltage and to present the amplified charging signal to a power transmitting coil for transmission of wireless power to a remote device. A communication circuit can be configured to detect amplitude variations in the RF charging signal; detect variations in a voltage level of the supply voltage; adjust the detected amplitude variations in the RF charging signal to compensate for detected variations in a voltage level; and decode data represented by the amplitude variations in the RF charging signal based upon the adjusted amplitude variations.

20 Claims, 4 Drawing Sheets

(56) References Cited

U.S. PATENT DOCUMENTS

| | | | | |
|---|---|---|---|---|
| 2008/0200119 | A1* | 8/2008 | Onishi | H04B 1/3883 |
| | | | | 455/41.1 |
| 2010/0172168 | A1* | 7/2010 | Fells | H02J 7/025 |
| | | | | 363/164 |
| 2010/0320962 | A1* | 12/2010 | Sekita | H02J 7/025 |
| | | | | 320/108 |
| 2011/0065398 | A1* | 3/2011 | Liu | H02J 5/005 |
| | | | | 455/127.1 |
| 2012/0313764 | A1* | 12/2012 | Weiss | H04B 3/56 |
| | | | | 340/12.32 |
| 2013/0076156 | A1* | 3/2013 | Anttila | H02J 5/005 |
| | | | | 307/104 |
| 2013/0316655 | A1* | 11/2013 | Fukuda | H04B 5/0031 |
| | | | | 455/67.11 |
| 2015/0002232 | A1* | 1/2015 | Tsuji | H03F 3/21 |
| | | | | 330/297 |

OTHER PUBLICATIONS

TL431 Family; "Adjustable precision shunt regulator", Product Data Sheet, Rev. 4, Jun. 30, 2011 (http://www.nxp.com/documents/data_sheet/TL431_FAM.pdf).

AN11509 NXQ1TXA1 Evaluation Board, Application Note Rev. 2, Feb. 2, 2015 (http://www.nxp.com/documents/application_note/AN11509.pdf).

Wireless Power Consortium, "Q1 System Description Wireless Power Transfer," vol. I: Low Power, Part 1; Interface Definition, Version 1.1.2, Wireless Power Consortium, Jun. 2013, 117 pages.

* cited by examiner

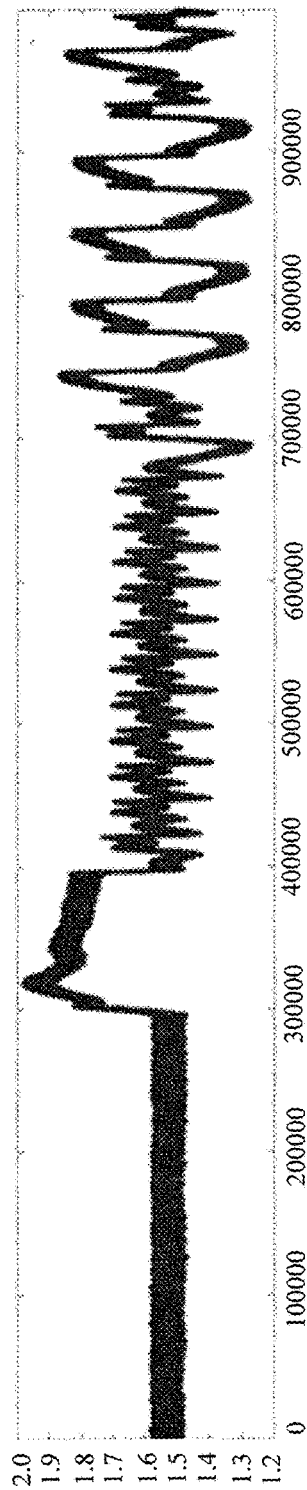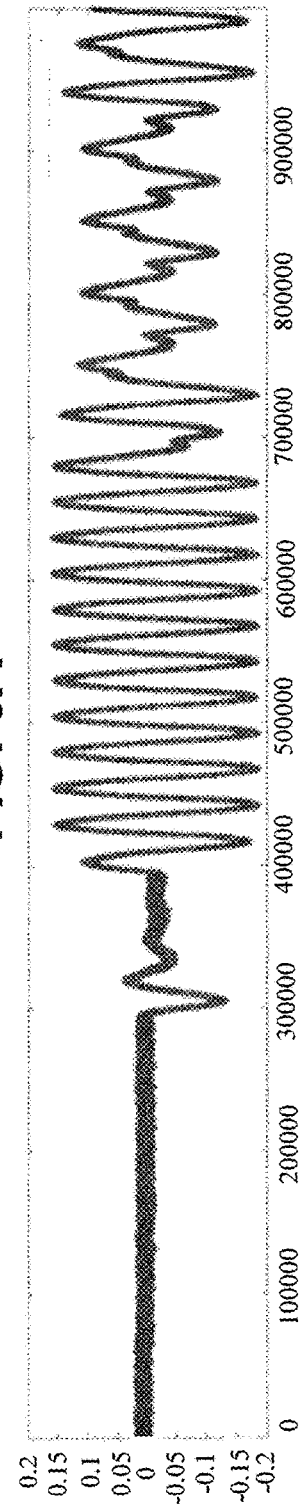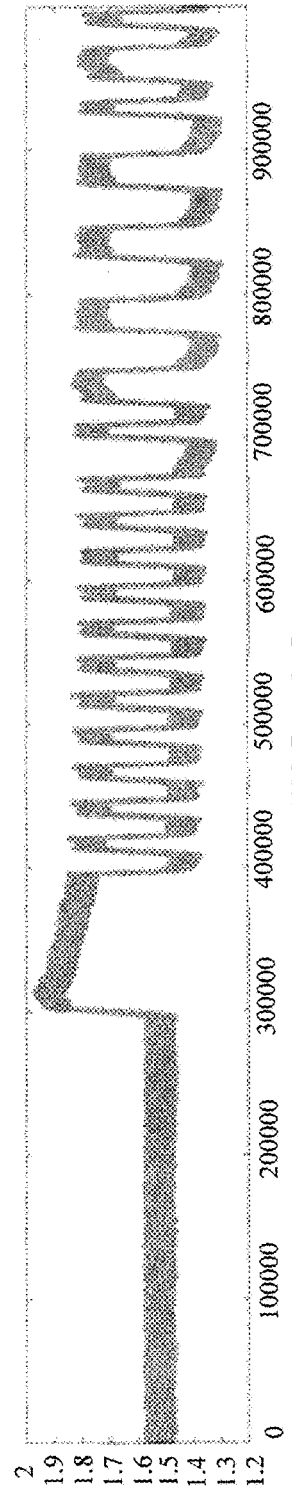
FIG. 3A
FIG. 3B
FIG. 3C

VOLTAGE SUPPLY COMPENSATION

OVERVIEW

Aspects of various embodiments are directed to radio frequency (RF) communications and to compensation for power supply variations.

Mobile devices, such as cellular (smart) phones, handheld tablets, and others, are increasingly used on a day-to-day basis and in varied locations and contexts. This is especially true for the rising number of smart phones that are being widely used by more and more individuals. This increase in use can create new problems with charging the devices in a convenient way, such as when these devices are used in situations where a conventional wall outlet and power cord are inconvenient or unavailable.

Wireless charging can be added into some mobile devices to allow for charging without the use of a conventional wall outlet and power cord. For instance, a wireless device can include a charging circuit that is configured to receive power from a charging station using inductive coupling. Qi is an example of a wireless charging standard that uses inductive coupling to wirelessly transfer power for charging purposes. Cost, physical size, and other considerations can limit the design choices available for implementing the wireless charging devices and circuits.

These and other matters have presented challenges to wireless charging circuits and implementations, for a variety of applications.

SUMMARY

Embodiments of the present disclosure are directed toward an apparatus that includes a power transmitting coil. A power supply circuit is configured to generate a supply voltage that provides power to the apparatus. A signal generation circuit is configured to generate a radio frequency (RF) charging signal. An amplification circuit is configured to amplify the RF charging signal using the supply voltage and to present the amplified charging signal to the power transmitting coil for transmission of wireless power to a remote device. A communication circuit is configured to detect amplitude variations in the RF charging signal; detect variations in a voltage level of the supply voltage; adjust the detected amplitude variations in the RF charging signal to compensate for detected variations in a voltage level; and decode data represented by the amplitude variations in the RF charging signal based upon the adjusted amplitude variations.

Various embodiments are directed toward, a method that includes generating a radio frequency (RF) charging signal; amplifying the charging signal using a supply voltage; presenting the amplified charging signal to a power transmitting coil for transmission of wireless power to a remote device; detecting amplitude variations in the charging signal; detecting variations in a voltage level of the supply voltage; adjusting the detected amplitude variations in the charging signal to compensate for detected variations in a voltage level; and decoding data represented by the amplitude variations in the charging signal based upon the adjusted amplitude variations.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which:

FIG. 3A depicts the ASK signal after demodulation by the charging station, consistent with embodiments of the present disclosure;

FIG. 3B shows the variations in the DC supply voltage, consistent with embodiments of the present disclosure;

FIG. 3C shows a waveform in which the charging station applies compensation to the ASK signal from FIG. 3A, consistent with embodiments of the present disclosure.

Figure 1:
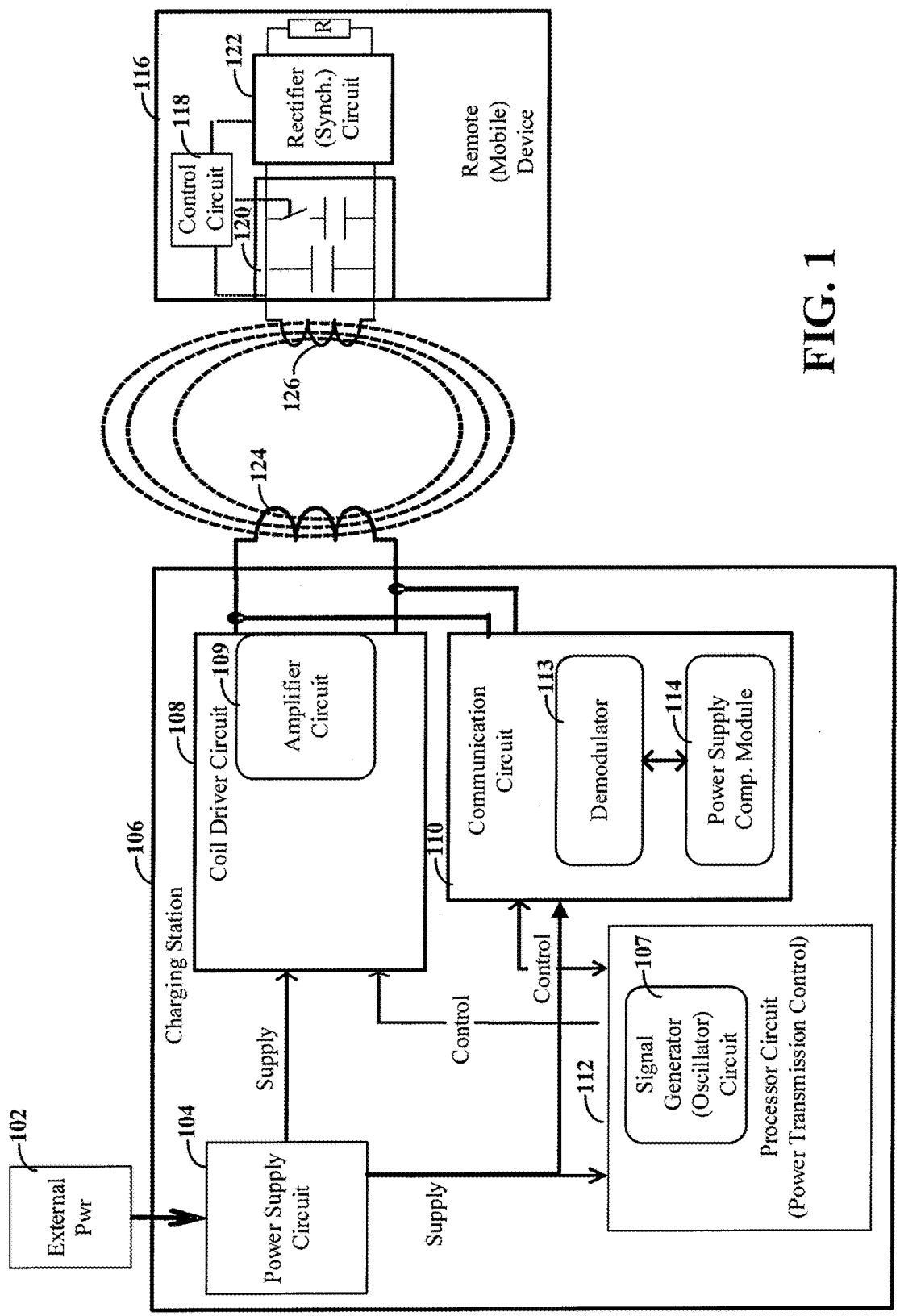
FIG. 1 depicts a block diagram of a system for using wireless signals to charge mobile devices, consistent with embodiments of the present disclosure.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving wireless charging of devices. In certain implementations, aspects of the present disclosure have been shown to be beneficial when used in the context of wireless charging while using in-band communication. In some embodiments, the in-band communication can disrupt the voltages provided by a power supply circuit of the charging station. These and other aspects can be implemented to address challenges, including those discussed in the background above. While not necessarily so limited, various aspects may be appreciated through a discussion of examples using such exemplary contexts.

Consistent with embodiments, wireless power transfer systems can be configured to use in-band communication where data communication is provided using the same carrier frequency that is used to provide the wireless power. The data communication can be used for various purposes, such as feedback to regulate the amount of power provided, and assure system safety through control of power or other parameters. In particular embodiments, a device being charged can communicate data through backscatter (load) modulation of the RF signal used to provide the wireless power.

Various embodiments relate to the, somewhat surprising, finding that in-band communications can result in fluctuations/variations in the supply voltage of the power supply circuit for the charging station and that the variations can disrupt decoding of the in-band communications. This disruption can be particularly prevalent for coding techniques that rely upon amplitude modulation, such as amplitude-shift keying (ASK). Particular embodiments are directed toward the detection of amplitude variations in the supply voltage and toward compensating for the detected variations as part of the decoding process.

In certain embodiments, decoding circuitry can be configured to process received data with and without compensation for the detected variations. In some instances, these two different decoding solutions can be carried out sequentially, e.g., after failing to detect a valid signal without compensation, the compensation can be applied to a received signal. In various instances, the two different decoding solutions can be carried out in parallel and valid data from either decoding solution can then be used by the system.

According to various embodiments, a charging station can be configured to provide power using a wireless power transfer protocol standard such as those associated with Qi, power matters alliance (pma), or alliance for wireless power. For compliance with the Qi standard, the charging station can be configured to generate an RF charging signal at frequencies between 100 and 205 KHz. Other frequencies are possible for other standards or for future changes to existing standards. The in-band communication from a remote device (for Qi compliance) can include ASK (load) modulation at 2 KHz. Other amplitude modulation schemes and frequencies are also possible.

Turning now to the figures, FIG. 1 depicts a block diagram of a system for using wireless signals to charge mobile devices, consistent with embodiments of the present disclosure. According to embodiments, a charging station 106 can be configured to provide wireless power to one or more remote (mobile) devices 116. For instance, the charging station can generate a wireless RF signal that is transmitted to the mobile device using inductive coupling between power transmitting coil 124 and power receiving coil 126. Charging station 106 can be configured to receive power from an external power source 102. For example, the external power source 102 can be an alternating current (AC) power source, such as is provided by a wall outlet and converted to a direct current (DC) voltage by an external power converter. Power supply circuit 104 can be configured to generate, from the external DC voltages, DC voltage(s) that are used by the charging station 106. According to some embodiments, the power supply circuit 104 may include multiple DC supply circuits for different voltages. For example, the supply voltage used for driving the power transmitting coil 124 might be relatively high (e.g., 19 Volts), while the supply voltage(s) used to power various logic circuits might be lower (e.g., 3 or 5 Volts).

Consistent with certain embodiments, a coil driver circuit 108 can be configured to present the signal to the power transmitting coil 124. For instance, coil driver circuit 108 can receive an RF charging signal from a signal generator circuit 107 that generates an RF charging signal. While signal generator circuit 107 is depicted as part of the processor circuit 112, the RF charging signal can also be generated using a dedicated oscillator circuit that is external to the processor circuit 112. An amplifier circuit 109 can be configured to amplify the charging signal using the supply voltage. The amplified charging signal can then be presented to the power transmitting coil 124 for transmission. Power receiving coil 126 can then receive wireless power through inductive coupling. The received power can be rectified by a rectifier circuit 122 and used to charge a storage element, such as a battery, of the remote device 116.

According to embodiments, remote device 116 can be configured to communicate information to the charging station 106. This information might include, for example, presence of the remote device, feedback on the charge status of the remote device, and data reflecting the desired power level for the RF charging signal. In particular embodiments, the communication can be transmitted in-band, relative to the RF charging signal, by modulating the RF charging signal. For instance, the amplitude of the RF charging signal could be modulated by varying the effective load of the remote device. This can be accomplished using, for example, a switching circuit 120 that is configured to add or remove a load element, which can be resistive (R), capacitive, inductive, or combinations thereof. The switching circuit 120 can be controlled by a control circuit 118. In some embodiments, the control circuit can include one or more small microchips that are configured to store small amounts of information.

Communication circuit 110 can be configured to monitor for, and decode, in-band communications received from a remote device 116. In the amplitude modulation context, this can include detecting variations in the charging signal amplitude, with respect to the signal at the power transmitting coil 124. Demodulator circuit 113 can be configured to decode the detected variations according to one or more encoding schemes. For instance, one amplitude modulation encoding scheme is amplitude-shift keying (ASK). The results of the demodulation can then be provided to a processor circuit 112, which can be configured to control the power transmission in response to the demodulated data. For example, the demodulated data can indicate the presence (or absence) of a remote device, and the processor circuit 112 can be configured to maintain and adjust the RF charging signal if a remote device is present. The processor circuit 112 might also be configured to adjust the power level of the charging signal based upon input from a remote device.

Consistent with various embodiments, it is recognized that the power supply circuit 104 can be a non-ideal supply. In particular, an ideal power supply circuit would provide the same voltage irrespective of current draw and the rate of change thereof. Non-ideal supply circuits, however, may have variations in the voltage level of their output supply voltage. These variations can be the result of changes in the output load (and corresponding current draw), or from other sources, such as external noise. For example, a power supply circuit may have insufficient current-providing capabilities to maintain a constant DC voltage when a remote device load modulates the RF signal. While DC supply circuits can be designed to reduce, or even eliminate, such non-idealities, aspects of the present disclosure recognize that such designs can have additional costs associated therewith and are not always desirable.

It has been discovered, that such variations in the output supply voltage can complicate decoding of in-band communications from the remote device. This is particularly true when the variations are correlated with amplitude variations introduced to the charging signal in order to convey the data (e.g., using load modulation and a protocol such as ASK). The correlation can be caused by the changes in the current draw resulting from the remote device's modulation. For instance, the effective load seen by the coil driver circuit 108 is a function of the inductive coupling between the power transmitting coil 124 and power receiving coil 126 and also the load presented to power receiving coil 126 by the remote device 116. Thus, when the remote device 116 modulates the amplitude of the charging signal by adjusting the load (e.g., capacitance, resistance, inductive, or combinations thereof)

provided by the switching circuit 120, the current drawn by the coil driver circuit 108 can change significantly. This additional current draw can create a corresponding change in the voltage of the output supply voltage, and the change in the supply voltage can interfere with the ability to demodulate and decode the data from the remote device 116. In particular, the change in the output supply voltage can be passed to the coil driver circuit 108 and ultimately to the demodulator circuit 113.

According to various embodiments, the charging station can include a power supply compensation circuit (or module) 114 that is configured to detect variations in a voltage level of the supply voltage and to compensate for detected variations in the voltage level by adjusting the RF signal received from the transmitting coil. For example, the compensation module 114 can be configured to cancel (by subtraction) the detected variations in the voltage level of the supply voltage from the detected variations in the charging signal. In particular embodiments, this compensation can be performed in the digital realm. For instance, the voltage levels of the supply voltage and the charging signal can be sampled by analog-to-digital converter (ADC) circuits. The resulting digital sampling data can then processed by a digital signal processing (DSP) circuit. The DSP circuit can be configured to apply a compensation algorithm that combines the sampled data to cancel variations in the charging signal that are due to changes in the supply voltage, thereby leaving voltage variations that are due to the modulation by the remote device 116.

Consistent with certain embodiments, the communication circuit 110 can be configured to first attempt to demodulate without using compensation from the power supply compensation module 114. If, however, valid data is not detected, the communication circuit can enable the power supply compensation module 114 in order to detect data that might have been obscured by power supply variations. In some embodiments, the compensation can be retroactively applied to the same charging signal/time period as the original demodulation attempt, which did not include the compensation. The compensation can also, or in the alternative, be applied to a subsequently monitored charging/time period. The delayed application of the compensation can be particularly useful for reducing the processing resources consumed by the demodulation in situations where the compensation is unnecessary to decode the data.

According to various embodiments, the communication circuit 110 can be configured to attempt to demodulate a received charging signal using two parallel paths, one with and one without compensation. If either of the parallel demodulation paths detects a valid transmission, the data can be provided to the processor circuit 112. These parallel determinations of can be useful for increasing the reliability of the communications.

Figure 2:
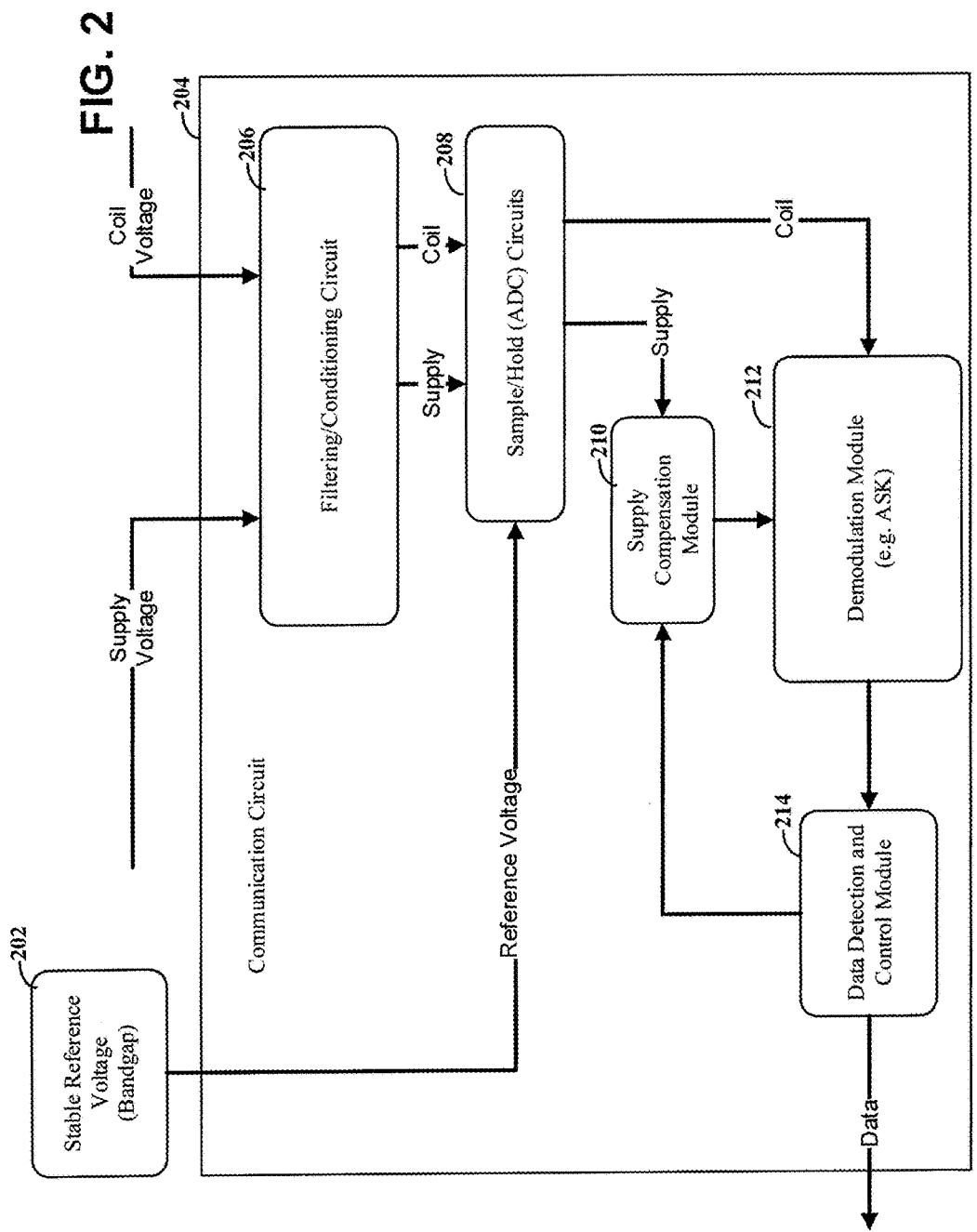
FIG. 2 depicts a block diagram for a communication circuit for use in a charging station, consistent with embodiments of the present disclosure.

FIG. 2 depicts a block diagram for a communication circuit for use in a charging station, consistent with embodiments of the present disclosure. The communication circuit 204 can be configured to receive both the supply voltage and the coil voltage, consistent with the discussion of FIG. 1. In certain embodiments, these voltages can be filtered and conditioned using a filtering and conditioning circuit 206 (or just "filter circuit"). The voltages can then be sampled with a sample/hold (ADC) circuit 208 to produce digital data representing the same. Demodulation module 212 can be configured to detect amplitude variations for the coil voltage (which is also referred to as the charging signal). The detected variations can be used to detect and demodulate communications from a remote device, which can use an in-band communication protocol. A particular example of such a protocol is ASK using load modulation at the remote device.

Supply compensation module 210 can be configured to detect variations in the supply voltage and provide a compensation signal to the demodulation module 212. The compensation signal can include voltage variations that are derived from the detected variations in the supply voltage. The demodulation module 212 can be configured to subtract the compensation signal from the coil voltage to produce a compensated signal, which can be subsequently demodulated using the appropriate data protocol(s) relative to the remote devices. In certain embodiments, a gain correction (e.g., a multiplier) can be applied to the compensation signal before it is applied to the coil voltage.

According to embodiments, a data detection and control module 214 can be configured to verify that the demodulated data is valid. This may include, for example, checking the data against an expected data sequence (e.g., a preamble data string). If valid data is detected, it can be provided to a processing circuit of the charging station (e.g., for control over the charging signal). In some embodiments, if no valid data is detected, this information can be provided back to the supply compensation module 210 in order to enable the compensation. More particularly, the demodulation module 212 can first attempt to demodulate the received data without a compensation signal. In response to no valid data being detected, the supply compensation module 210 can be enabled and the demodulation module can then attempt to demodulate received data using the compensation signal.

It has been recognized that the potential correlation between the supply voltage and the coil voltage can result in common noise being present on both voltages. A filtering and conditioning circuit 206 can be designed to remove the noise from the coil voltage (e.g., using bandpass filtering centered on the communication protocol frequency). If similar filtering and conditioning is not applied to the supply voltage, noise on the supply voltage (other than the noise correlated to modulation for which compensation is desired) may be inadvertently introduced through the compensation signal. Accordingly, various embodiments of the present disclosure are directed toward providing a common (or similar) filtering and conditioning circuit for both the supply voltage and coil voltage that removes unwanted frequencies on both signals.

The filtering and conditioning circuit 206 is depicted as being located prior to the ADC circuits 208, which is consistent with embodiments where the signal filtering and conditioning are carried out in the analog realm. Various embodiments contemplate signal filtering and conditioning that can be carried out in the digital realm, after the ADC circuits 208. Moreover, a combination of analog and digital signal filtering and conditioning can be performed for both the supply voltage and the coil voltage.

Consistent with embodiments of the present disclosure, a stable reference voltage circuit 202 can be configured to provide a reference voltage that is used by the ADC circuits 208 to detect variations in the supply voltage. Accordingly, the reference voltage can be generated such that the reference voltage is substantially independent from the supply voltage, with respect to the voltage variations caused by load modulation from a remote device. In some instances, the stable reference voltage can be generated from a bandgap circuit that is configured to produce a fixed voltage that is irrespective of power supply variations, temperature changes and loading.

According to various embodiments, one or more of the blocks and modules depicted in FIG. 2 can be carried out within a DSP circuit. A memory circuit can store instructions that, when executed by the DSP circuit, provide the functions and algorithms described in connection with FIG. 2. Various aspects can also be implemented with discrete logic, programmable logic, and combinations thereof.

According to various embodiments a coil driver circuit can be configured to generate a charging signal that is received by a wireless charging circuit and used for powering and charging of the remote device. In certain instances, the coil driver circuit can includes a half-bridge circuit that produces the charging signal at the desired voltage. A voltage supply can provide power (e.g., ~19 Volts) for driving the power transmitting coil.

A wireless charging circuit can be configured to receive power through inductive coupling between the power transmitting coil and the power receiving coil. The power can be provided to a load, which can include a chargeable power source (e.g., a battery or a super-capacitor) and other circuitry. A switch (e.g., transistor) can be controlled in order to change the effective load (impedance) of the wireless charging circuit relative to the coil driver circuit. The change in the effective load can result in a corresponding amplitude change of the charging signal. As discussed herein, if the voltage supply is less than ideal, the change in impedance can manifest itself as a change in the output voltage provided by the voltage supply.

Accordingly, inductive coupling between the power receiving coil and the power transmitting coil can result in an amplitude reduction in the charging signal at the power transmitting coil that corresponds to the amplitude reduction at the power receiving coil. Somewhat surprisingly, the modulation on the power transmitting coil shows up on the DC supply voltage at a level that is sufficient to disrupt communications.

FIGS. 3A-C show voltage waveforms derived from experimental simulation and for different signals with voltage on the vertical access and time on the horizontal access, consistent with embodiments of the present disclosure. Each of the signals was generated using an experimental circuit in which the DC voltage supply was set to a low current limit and using ASK load modulation. FIG. 3A depicts the ASK signal after demodulation by the charging station, consistent with embodiments of the present disclosure. The waveform of FIG. 3A is distorted enough that data may be lost and a corresponding data packet may be rejected as invalid. FIG. 3B shows the variations in the DC supply voltage, consistent with embodiments of the present disclosure. The waveform shows zero volts as being referenced to a nominal DC supply voltage. Thus, negative values represent negative deviations and positive values indicate positive deviations, relative to the nominal DC supply voltage (e.g., 19V). FIG. 3C shows a waveform in which the charging station applies compensation to the ASK signal from FIG. 3A, consistent with embodiments of the present disclosure. As shown in FIG. 3C, the resulting waveform provides improved ASK signaling that can be correctly decoded.

Figure 4:
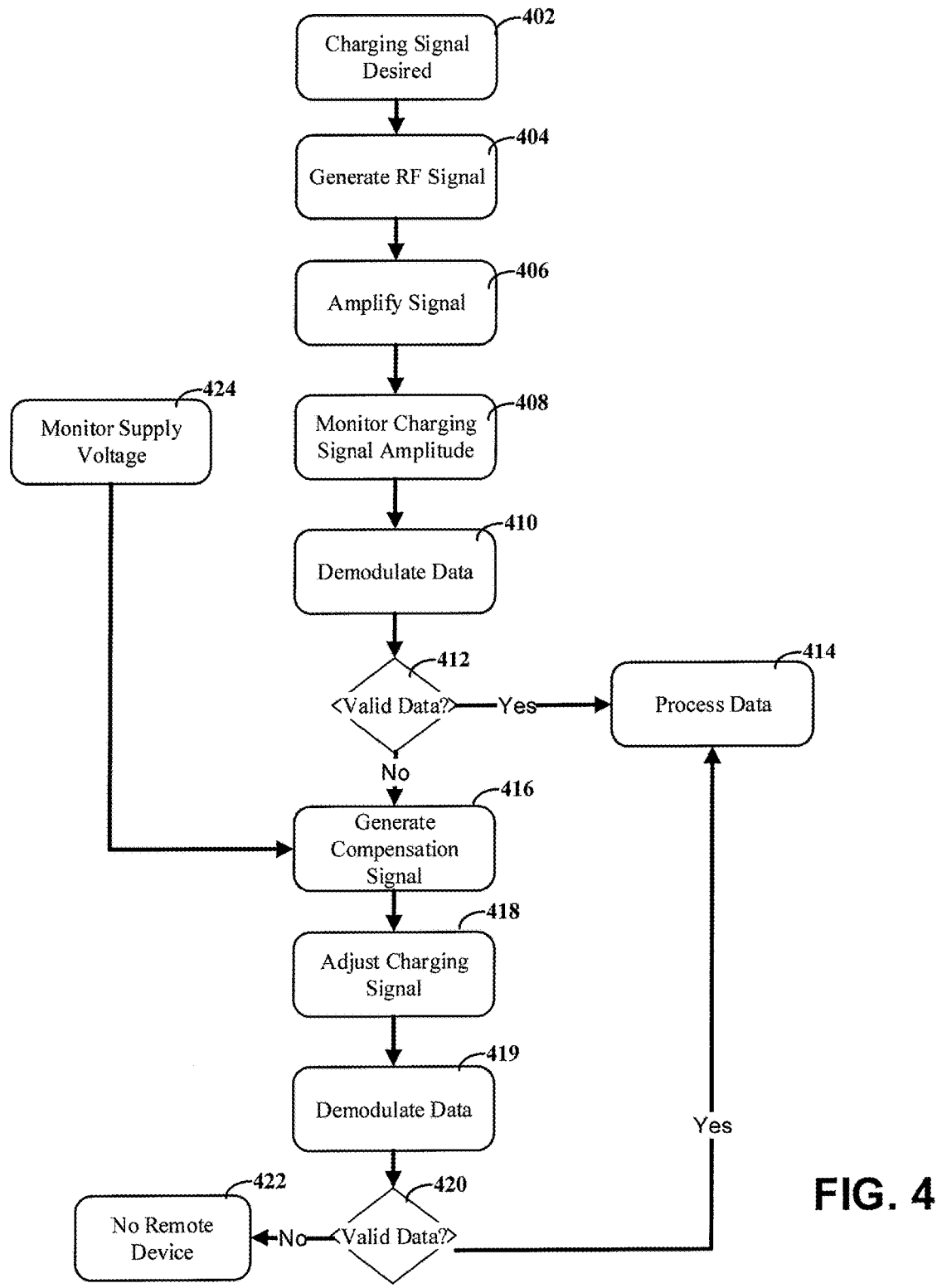
FIG. 4 depicts a flow diagram for use with wireless charging stations, consistent with embodiments of the present disclosure.

FIG. 4 depicts a flow diagram for use with wireless charging stations, consistent with embodiments of the present disclosure. The wireless charging station can determine that a charging signal should be generated, per block 402. In certain embodiments, the charging signal can be generated at predetermined intervals, whether periodically or otherwise. This allows for the charging station to detect the presence of a mobile device, but also save power between the intervals. The charging signal can also be generated in response to triggering events, such as a button being pressed, external power being provided, or the detection of a nearby object (potentially a mobile device) using a sensor.

The charging station can respond to the determination from block 402 by generating an RF signal, per block 404. In some embodiments, this can be accomplished using a PWM block inside of a microcontroller or DSP. In various embodiments, an oscillator circuit can be used, such as a ring oscillator circuit or an LC tank oscillator circuit. The generated RF signal can then be amplified so that it can be presented to the power transmitting coil, per block 406. The particular type of amplifier circuit can be selected based upon factors such as the desired range for charging mobile devices, the amount of power to be provided, the frequency of the RF signal, and other considerations.

The charging station can then monitor the charging signal amplitude to detect in-band communications from a mobile station, such as the use of backscattering using load modulation, per block 408. As discussed herein, this can include the use of an ADC that samples the RF signal at the power transmitting coil. The RF signal is then filtered (e.g., to remove unwanted noise, harmonics, interference, and the like). The filtering can occur before the ADC sampling, after the ADC sampling, or both before and after the ADC sampling.

The monitored signal amplitude can then be demodulated as part of the process of identifying data transmitted by a remote device, per block 410. If valid data is detected (block 412), the data can be processed, as shown by block 414. The processing of the data may be used for a variety of purposes, such as confirming the presence of a mobile device, adjusting the strength of the RF signal in response to an indication of the power needs for a mobile device, and disabling the RF signal in response to an indication that a mobile device is fully powered or an over-temperature warning (e.g., as might occur during charging of the mobile device). Other communications and responses are also possible.

If valid data is not detected, then the mobile station can generate a compensation signal, per block 416. The compensation signal can be generated based upon monitoring of the supply voltage, as shown by block 424. There are various manners in which the monitoring of the supply voltage can be carried out. For instance, the monitoring can be implemented continuously, irrespective of whether valid data is detected. In such instances, a data queue, stored in a memory circuit, can hold data corresponding to the monitored voltage of the supply and also store timing data that allows the supply voltage to be correlated to RF signal data collected according to block 408. The charging station (e.g., using a DSP) can retrieve the appropriate data and generate the compensation signal. In certain instances, the data corresponding to the monitored voltage of the supply can be streamed and processed in (near) real time.

The charging signal amplitude data can then be adjusted based upon the compensation signal, per block 418. The resulting signal can then be demodulated, per block 419. If valid data is detected, then the data can be processed, as shown by block 414. If no valid data is detected, then the charging station can determine that no remote/mobile device is present and respond according (e.g., by disabling the charging signal to save power).

Consistent with embodiments, if valid data is not detected at block 420, the charging station can be configured to determine that there is no remote device, per block 422. In some embodiments, the charging station can be configured to adjust the compensation signal and/or how the compensation signal is used to adjust the charging signal. For instance, one or more coefficients can be used to control the amount of compensation provided in response to a particular amount of amplitude change in the supply voltage. This may take form of: compensated_signal=coil_amplitude variation−(G*SupplyVariation), where the parameter/coefficient G has a relation Peak Coil Voltage/nominal supply voltage that can be varied. For example, G could be chosen to equal the peak coil voltage/nominal supply voltage, or for different G values the adjustment can be repeated, and if no valid data is detected for any adjustment value, the charging station can be configured to determine that there is no remote device, per block 422

Various blocks, modules or other circuits may be implemented to carry out one or more of the operations and activities described herein and/or shown in the figures. In these contexts, a "block" (also sometimes "circuit", "logic circuitry", or "module") can be implemented using a circuit that carries out one or more of these or related operations/ activities. In various embodiments, a hard-wired control block can be used to minimize the area for such an implementation in case a limited flexibility is sufficient. Alternatively and/or in addition, in certain of the above-discussed embodiments, one or more modules are discreet logic circuits or programmable logic circuits configured and arranged for implementing these operations/activities.

Based upon the above discussion and illustrations, those skilled in the art will readily recognize that various modifications and changes may be made to the various embodiments without strictly following the exemplary embodiments and applications illustrated and described herein. For example, an apparatus can include different circuits, modules, and configurations than illustrated by the figures. Such modifications do not depart from the true spirit and scope of various aspects of the invention, including aspects set forth in the claims.

What is claimed is:

1. An apparatus comprising:
a power transmitting coil;
a power supply circuit configured to generate a supply voltage that provides power to the apparatus;
a signal generation circuit configured to generate a radio frequency (RF) charging signal;
an amplification circuit configured to amplify the RF charging signal using the supply voltage and to present the amplified charging signal to the power transmitting coil for transmission of wireless power to a remote device;
a communication circuit configured to:
detect amplitude variations in the RF charging signal;
detect voltage level variations of the supply voltage;
adjust the detected amplitude variations in the RF charging signal to compensate for the detected voltage level variations; and
decode data represented by the amplitude variations in the RF charging signal based upon the adjusted amplitude variations.

2. The apparatus of claim 1, wherein the voltage level variations of the supply voltage include variations resulting from insufficient current-providing capabilities of the power supply circuit.

3. The apparatus of claim 1, further comprising a filter circuit that is configured to filter both the supply voltage and the RF charging signal.

4. The apparatus of claim 1, wherein the communication circuit is further configured to decode data represented by the amplitude variations in the RF charging signal based upon the detected amplitude variations in the RF charging signal without adjustment for the detected voltage level variations.

5. The apparatus of claim 4, wherein the communication circuit is further configured to decode data represented by the amplitude variations in the RF charging signal based upon the adjusted amplitude variations, in response to determining that the data, represented by the amplitude variations in the RF charging signal based upon the detected amplitude variations in the RF charging signal without adjustment for the detected voltage level variations, is invalid.

6. The apparatus of claim 4, wherein the communication circuit is further configured to select between the data represented by the amplitude variations in the RF charging signal based upon the adjusted amplitude variations and the data represented by the amplitude variations in the RF charging signal based upon the detected amplitude variations in the RF charging signal without adjustment for the detected voltage level variations, based upon a parallel determination of validity for each of the data.

7. The apparatus of claim 1, wherein the data represented by the amplitude variations is modulated using amplitude-shift-keying.

8. The apparatus of claim 1, wherein the apparatus is part of a charging station that is configured to adjust the power of the RF charging signal in response to the data represented by the amplitude variations in the RF charging signal.

9. The apparatus of claim 1, wherein the communication circuit is further configured to generate a compensation signal based upon the detected voltage level variations of the supply voltage and an adjustable coefficient.

10. A method comprising:
generating a radio frequency (RF) charging signal;
amplifying the charging signal using a supply voltage;
presenting the amplified charging signal to a power transmitting coil for transmission of wireless power to a remote device;
detecting amplitude variations in the charging signal;
detecting voltage level variations of the supply voltage;
adjusting the detected amplitude variations in the charging signal to compensate for detected voltage level variations; and
decoding data represented by the amplitude variations in the charging signal based upon the adjusted amplitude variations.

11. The method of claim 10, wherein the voltage level variations of the supply voltage include variations resulting from insufficient current-providing capabilities of the power supply circuit.

12. The method of claim 10, further comprising filtering both the supply voltage and the RF charging signal using a common filter circuit.

13. The method of claim 10, further comprising decoding data represented by the amplitude variations in the RF charging signal based upon the detected amplitude variations in the RF charging signal without adjustment for the detected voltage level variations.

14. The method of claim 13, further comprising:
decoding data represented by the amplitude variations in the RF charging signal based upon the adjusted amplitude variations, in response to determining that the data, represented by the amplitude variations in the RF charging signal based upon the detected amplitude variations in the RF charging signal without adjustment for the detected voltage level variations, is invalid.

15. The method of claim 13, further comprising selecting between the data represented by the amplitude variations in the RF charging signal based upon the adjusted amplitude variations and the data represented by the amplitude variations in the RF charging signal based upon the detected amplitude variations in the RF charging signal without adjustment for the detected voltage level variations, based upon a parallel determination of validity for each of the data.

16. The method of claim 10, wherein the data represented by the amplitude variations is modulated using amplitude-shift-keying.

17. The method of claim 10, further comprising adjusting the power of the RF charging signal in response to the data represented by the amplitude variations in the RF charging signal.

18. The method of claim 10, further comprising generating a compensation signal based upon the voltage level variations of the supply voltage and an adjustable coefficient.

19. The apparatus of claim 1, wherein the communication circuit is further configured to compensate for the detected voltage level variations by subtracting the detected voltage level variations from the detected amplitude variations in the RF charging signal.

20. The method of claim 10, wherein adjusting the detected amplitude variations in the charging signal further comprises adjusting the detected amplitude variations in the charging signal by subtracting the detected voltage level variations from the detected amplitude variations in the RF charging signal.

* * * * *